J. F. ELLIOTT.
Watering-Trough for Stock.

No. 226,227.                    Patented April 6, 1880.

Attest
Charles H. Schoff
Joseph P. Whiting

INVENTOR
James F. Elliott
By James K. Coyne
his Attorney.

UNITED STATES PATENT OFFICE.

JAMES F. ELLIOTT, OF PRINCETON, ILLINOIS.

WATERING-TROUGH FOR STOCK.

SPECIFICATION forming part of Letters Patent No. 226,227, dated April 6, 1880.

Application filed July 29, 1879.

*To all whom it may concern:*

Be it known that I, JAMES F. ELLIOTT, of Princeton, in the county of Bureau and State of Illinois, have invented certain new and useful Improvements in Watering-Troughs, of which the following, in connection with the accompanying drawings, is a specification.

Figure 1:
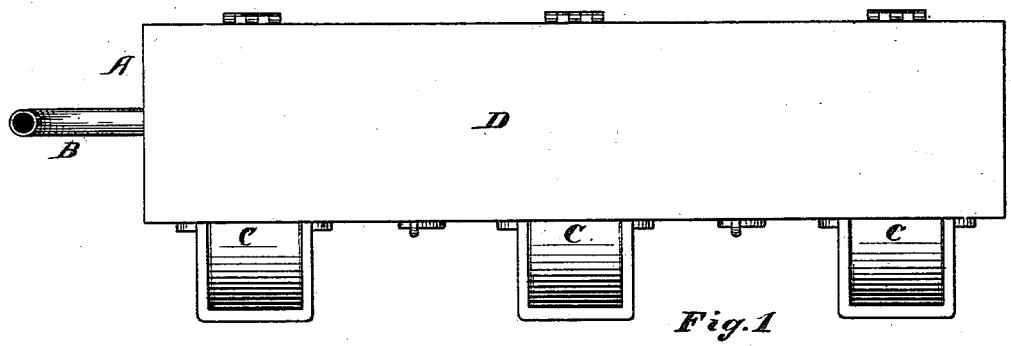
Figure 2:
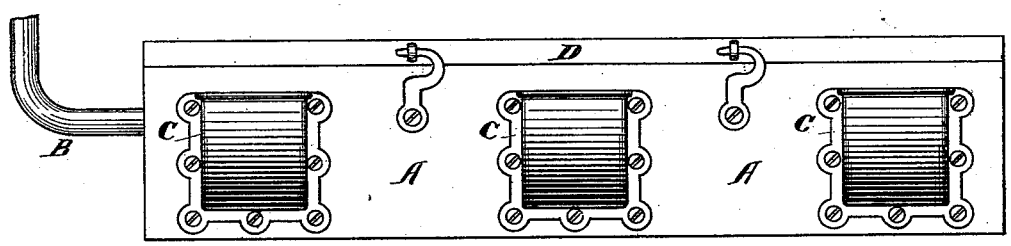

In the drawings, Figure 1 is a top or plan view of a watering-trough embodying my invention; Fig. 2, a front or side elevation thereof, and Fig. 3 a vertical central cross-section of the same.

Like letters of reference indicate like parts.

A represents a water-trough entered by a feed-water or supply pipe, B, intended to operate in connection with a supply tank or reservoir and with a float-valve or other automatic feed-valve employed to supply water to the trough A automatically as fast as exhausted, substantially as described in Letters Patent No. 217,080 of the United States of America, dated July 1, 1879, and issued to me for improvements in water-troughs for hogs.

Figure 3:
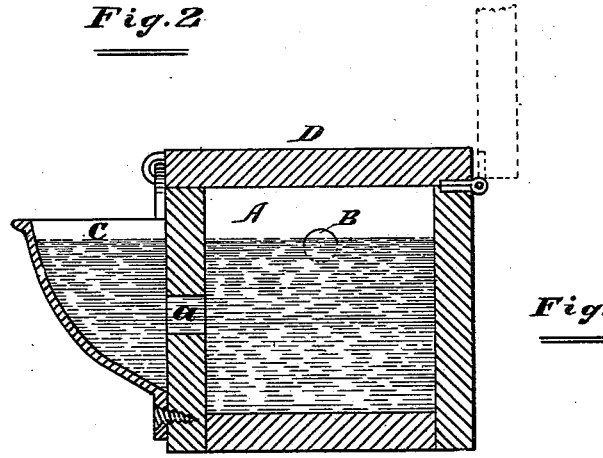

C C are supplemental troughs or buckets, open at the top and applied to the sides or vertical parts of the trough A, and *a a* are ports connecting the buckets C C with the trough A interiorly, so that the water will stand at the same height in all, as indicated in Fig. 3. I make the buckets C C very small compared to the trough A, but large enough to permit stock to drink therefrom with facility.

D is a lid on the trough A, and may be secured thereto in any suitable or well-known way, preferably by means of ordinary hinges and hooks and staples, as shown in the drawings.

I employ a lid or cover for the trough A, for the purpose of preventing stock—such as hogs and pigs—from getting into the trough, and to keep out leaves and other matter from the water. The main trough may also be inclosed or fenced in by a fence or other inclosure, leaving only the buckets C C accessible.

I deem it best to make the trough A of wood and the buckets C C of metal, and the latter open at the back as well as at the top; but I do not desire to be restricted either to any particular material or to mere form.

It will be perceived from this description that the trough may be portable, that it is simple in its construction, and that, while the water is accessible at all times, the stock cannot get into the buckets which expose the water for drinking.

I am aware of the construction of feed-trough shown and described in English Letters Patent No. 972, dated April 5, 1866; but that trough has a conical or raised center or bottom in a large compartment, which bottom operates as a chute, in connection with several outer buckets, for discharging into the latter the food placed in the large compartment, and no supply-pipe is combined with that trough to keep it constantly supplied from an outer tank. That being a feed-trough and mine being a watering-trough, there are opportunity for and advantage in the features of construction which I have shown, and which do not appear and cannot well be used in connection with the trough shown and described in the said Letters Patent when the purpose for which the trough is intended is considered. For example, if the trough referred to be used as a watering-trough, it is evident that it would hold no more water after being filled until the outer buckets were full; and it is also evident that the outer buckets would not be automatically filled after the water receded to the level of their bottoms. Besides this, for a watering-trough I would regard the attachment of a supply-pipe as a more simple feature of construction than a conical or raised bottom in the main part of the trough.

While I have not here shown and described a supplemental tank and an automatic feed-water valve opreating in connection with the pipe B, I have fully shown and described such parts in the Letters Patent heretofore issued to me and hereinbefore first referred to; and I deem my present invention merely as an improvement upon troughs intended to operate in connection with automatic feed-water valves, and hence an induction-pipe or feed-water port is an essential feature of my invention, and, having shown that, I have made reference to my former patent to enable others skilled in the art to connect my present invention with a suitable supply-tank and automatic feed-water valve.

I am also aware of the construction of basins shown and described in United States Letters Patent No. 206,454, dated July 30, 1878; but the apparatus there shown consists of a series of wash-basins supported on a horizontal main pipe, in connection with a water-supply-pipe overflow and valved discharge-pipe; but I do not here claim such. Neither do I claim, broadly, the construction shown and described in the said English Letters Patent; but,

Having thus described my invention, what I claim as new, and desire to secure by Letters Patent, is—

A stock-watering trough consisting of the combination of the trough A, having therein an induction port or opening for receiving a water-supply pipe, B, and feed-ports $a\ a$, the buckets C C, and the lid D, all arranged substantially as specified with relation to each other for operation together, in connection with an automatic feed-water valve, for the purposes set forth.

JAMES F. ELLIOTT.

Witnesses:
S. G. PADDOCK,
JAMES H. ECKELS.